3,255,199
CERTAIN THIOPHENE-2,5-DIYL-BIS
(BENZOXAZOLE) COMPOUNDS
Erwin Maeder, Aesch, Basel-Land, Peter Liechti, Binningen, and Adolf Emil Siegrist, Basel, Switzerland, assignors to Ciba Limited, Basel, Switzerland, a company of Switzerland
No Drawing. Filed Jan. 12, 1965, Ser. No. 425,061
Claims priority, application Switzerland, Jan. 17, 1964, 523/64
14 Claims. (Cl. 260—307)

The present invention provides valuable new 2,5-dibenzoxazolyl-thiophene compounds of the general formula (1)

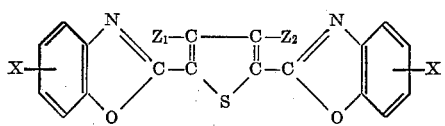

in which X represents a free or neutralized carboxyl group (—COO cation) or a functionally converted carboxyl group and $Z_1$ and $Z_2$ may be identical or different and each represents a hydrogen atom or a methyl group, and the benzene nuclei may contain further substituents.

Functionally converted carboxyl groups are preferably carboxylic acid ester groups, especially carboxylic acid alkyl ester groups, furthermore alkenyl, aryl or aralkyl ester groups, carboxylic acid halide groups, especially the acid chloride group —CO—Cl, the carboxylic acid nitrile group —CN, carboxylic acid amide groups (—CO—NH$_2$ and amide groups carrying organic substituents on the nitrogen atom).

Particularly valuable 2,5 - dibenzoxazolyl - thiophene compounds are those of the formula (2)

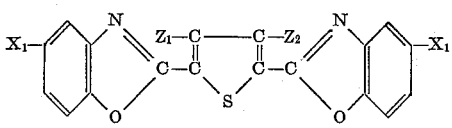

in which $X_1$ represents the group —COOH or —COOR (R=alkyl containing 1 to 20 carbon atoms) or a carboxylic acid amide group, and $Z_1$ and $Z_2$ may be identical or different and each represents a hydrogen atom or a methyl group.

Another special variant of the present invention includes 2,5-dibenzoxazolyl-thiophenes of the formula (2a)

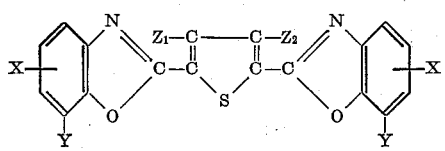

in which X, $Z_1$ and $Z_2$ have the above meanings and Y represents a lower alkoxy group. Of special importance in this groups are those compounds in which X has the meaning and position of $X_1$ in Formula 2 and Y represents a methoxy group.

The new 2,5-dibenzoxazolyl-thiophene compounds of the above general Formula 1 are obtained by known methods, for example by reacting an ortho-hydroxyaminobenzene, with or without intermediate isolation, at an elevated temperature and if desired or required in the presence of a catalyst, at the molecular ratio of 2:1 with a dicarboxylic acid of the formula (3)

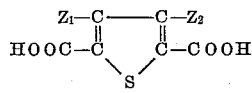

in which $Z_1$ and $Z_2$ may be identical or different and each represents a hydrogen atom or a methyl group, or with a functional derivative of this dicarboxylic acid, using an ortho-hydroxyaminobenzene of the formula (4)

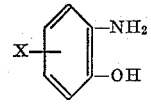

in which X represents a functionally converted carboxyl group, preferably a carboxylic acid ester group. This ortho-hydroxyaminobenzene may contain with advantage an additional alkoxy group, in ortho-position to the hydroxyl group, more especially a methoxy group. If desired, the functionally converted carboxyl groups in the products obtained in this manner may be hydrolyzed or converted into other functionally modified carboxyl groups.

Particularly suitable starting materials are, for example, ortho-hydroxyaminobenzenes of the formula (5)

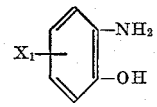

in which $X_1$ represents a carboxylic acid alkyl ester group, for example a carboxylic acid-methyl, -ethyl, -n-propyl, -isopropyl, n-butyl, -2-ethylhexyl or -methoxyethyl group. Ortho-hydroxyaminobenzenes of this kind are known or can be obtained by known methods.

The further used starting material is a dicarboxylic acid of the Formula 3, for example thiophene-2,5-dicarboxylic acid, 3,4 - dimethyl-thiophene - 2,5-dicarboxylic acid or monomethyl-thiophene-2,5-dicarboxylic acid, or a functional derivative of one of these dicarboxylic acids, preferably a dicarboxylic acid dichloride.

The reaction of the selected reactants can be performed with or without intermediate isolation by heating at an elevated temperature, for example from 160 to 320° C., advantageously in an inert gas, for example under nitrogen, and if required or desired, the reaction may be conducted in the presence of a catalyst. Suitable catalysts are, for example, boric acid, zinc chloride, para-toluenesulfonic acid, also poly-phosphoric acids including pyrophosphoric acid. When boric acid is used as catalyst, it is advantageously used in an amount of about 0.5 to 5% preferred to the total weight of the reaction mass. There may further be used as condensing medium high-boiling, polar organic solvents, for example dimethylformamide or aliphatic (if desired etherified) hydroxy compounds, for example dialkylcarbitols, propyleneglycol, ethyleneglycol monoethyl ether or diethyleneglycol diethyl ether and high-boiling esters of phthalic acid, for example phthalic acid dibutyl ester.

Alternatively, the reaction may be performed in two stages by first condensing 1 mol of a dicarboxylic acid of the Formula 3 or of a functional derivative thereof, especially a dicarboxylic acid dichloride, with 2 mols of ortho-hydroxyaminobenzene in the presence of an organic solvent such as toluene, a xylene, chlorobenzene, dichlorobenzene or nitrobenzene at an elevated temperature, whereupon the resulting acyl compound is converted into the dibenzoxazole at an elevated temperature, if desired or required in the presence of a catalyst. When a dicarboxylic acid dichloride is used as starting material, it may be prepared immediately prior to the condensation with the ortho-hydroxyaminobenzene and without isolation from the free dicarboxylic acids and thionylchloride in the same solvent in which the condensation is subsequently carried out.

The 2,5-dibenzoaxolyl-thiophene compounds of the formula (6)
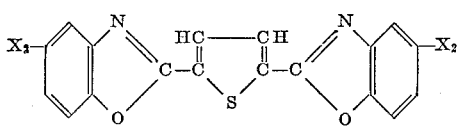

in which $X_2$ represents a carboxylic acid alkyl ester group or a free carboxyl group—can be manufactured, for example, by condensing thiophene-2,5-dicarboxylic acid dichloride in the molecular ratio of 1:2, in the presence of an organic solvent such as toluene or ortho-dichlorobenzene, with an ortho-hydroxyaminobenzene of the formula (7)
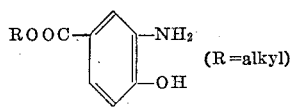

whereupon the resulting acylamino compound of the formula (8)
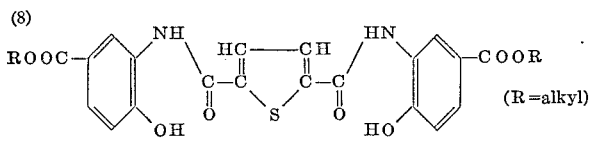

is converted, without using a catalyst or in the presence of boric acid and in an organic solvent at an elevated temperature, into the dibenzoxazole compound of the formula (9)
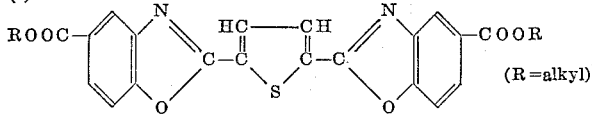

and, if desired, the carboxylic acid alkyl ester groups are hydrolyzed in the known manner. The conversion of free carboxyl groups into neutralized carboxyl groups (ammonium, metal or amine salts) or into functionally modified carboxyl groups is likewise achieved by known methods. Thus, for example, nitrile groups can be hydrolyzed, and/or free carboxyl groups esterified with organic hydroxy compounds (alcohols or phenols) or converted with, for example, thionylchloride into carboxylic acid chloride groups which are then converted into carboxylic acid amide groups by reaction with ammonia or with a primary or secondary amine.

In the form of solutions or fine dispersions the new thiophene derivatives of the composition defined above display a more or less pronounced fluorescence. They may be used for optically brightening a wide variety of materials, especially organic materials. Good results are obtained, for example, in brightening acrylic resin lacquers, alkyd resin lacquers, cellulose ester lacquers, for example acetylcellulose lacquers, or nitrocellulose ester lacquers. The new thiophene derivatives are particularly suitable for optical brightening synthetic fibres, for example fibres from cellulose esters such as cellulose propionate or acetylcellulose (cellulose diacetate or cellulose triacetate; acetate rayon), more especially fibres from polyamides (e.g., nylon) or polyesters (e.g., Dacron, terylene), polyurethanes, or from polyolefines such as polyethylene or polypropylene, from polyvinylchloride or polyvinylidenechloride, and also films, foils, tapes or mouldings from these materials or other materials such as polystyrene and its copolymers, for example, with unsaturated polyesters, polyvinyl alcohol or polyvinyl esters of organic acids, for example, polyvinyl acetate, or copolymers of organic vinyl esters with other copolymerizable monomers.

If the present process is to be used for optically brightening synthetic fibres—which may be in the form of staple fibres or filaments, in the crude state or in the form of hanks or woven fabrics—it is advantageously carried out in an aqueous medium in which the compounds concerned are suspended. If desired, the treating liquors may further contain a dispersant, for example, soaps, polyglycol ethers of fatty alcohols, fatty amines or alkylphenols, cellulose sulphite waste liquor or condensation products of formaldehyde with (possibly alkylated) naphthalenesulfonic acids. It has been found to be especially advantageous to work in a neutral, weakly alkaline or acid bath. Likewise, it is advantageous to perform the treatment at an elevated temperature from about 50 to 100° C., for example at the boiling temperature of the bath or near it (at about 90° C.). The improvement according to this invention can also be achieved with solutions in organic solvents.

The new thiophene derivatives to be used in the present process may also be added to, or incorporated with, the materials before or during their shaping. Thus, they may be added to the moulding compositions used for the manufacture of films, foils, tapes or shaped articles, or they may be dissolved or finely dispersed in the spinning mass before spinning. The new brighteners may also be added to the reaction mixtures before or during the polycondensation leading, for example, to polyamides or polyesters, or before or during the polymerization or monomers, for example vinyl acetate, to the polymerization masses.

The proportion of the new thiophene derivatives to be used, referred to the weight of the material to be optically brightened, may vary within wide limits. Even a very small amount, in certain cases for instance as little as 0.01%, may produce a distinct and durable effect. It is however, also possible to use an amount of up to about 0.5% or more.

The new thiophene derivatives may be used as brighteners also as follows:

(a) In admixture with dyestuffs or pigments or as additives to dyebaths, or printing, discharge or resist pastes. Furthermore also for after-treating dyeings, prints or discharge effects.

(b) In admixture with chemical bleaches or as additives to bleaching baths.

(b) In admixture with dressing agents such as starch or synthetic dressings. The products of this invention may also be used for example, to produce a crease-resistant finish by adding them to the liquors used for this purpose.

(d) In combination with detergents, the detergents and brighteners may be added to the washing liquors separately. It is also of advantage to use detergents that as such contain the brightener. Suitable detergents are, for example, soaps, salts of sulfonate detergents, for example of sulfonated benzimidazoles substituted on the 2-carbon atom by higher alkyl radicals; also salts of monocarboxylic acid esters of the 4-sulphophthalic acid with higher fatty alcohols: also salts of fatty alcohol sulfonates, alkylarylsulfonic acids or condensation products of higher fatty acids with aliphatic hydroxysulfonic or aminosulfonic acids. Furthermore, there may be used nonionic detergents, for example polyglycol ethers derived from ethylene oxide and higher fatty alcohols, alkylphenols or fatty amines.

If the present process is combined with other treatment or improving operations, the combined treatment is advantageously carried out with the aid of suitable preparations. These stable preparations contain compounds of the above Formula 1 as well as dispersants, detergents, dyestuffs, pigments or dressing agents.

The compounds of the above Formula 1 may also be used after having been fixed on a finely dispersed vehicle.

The brightening effects that can be achieved with the compounds of the Formula 1 are very valuable. More particularly, brightening effects on polyamide fibres and polyesters are distinguished by their neutral white, good fastness to light and good thermostability or, respectively, stability towards migration.

Unless otherwise indicated, parts and percentages in the following examples are by weight.

Example 1

A mixture of 172 parts of thiophene-2,5-dicarboxylic acid, 1600 parts by volume of ortho-dichlorobenzene, 300 parts by volume of thionylchloride and 2 parts by volume of pyridine is stirred for 12 hours at 85 to 90° C. Hydrochloric acid gas escapes and a clear, yellowish solution forms. The excess thionylchloride is then suctioned off under vacuum and the solution of the acid chloride in dichlorobenzene is cooled to 50° C. 334 parts of 3-amino-4-hydroxybenzoic acid methyl ester are added, whereupon a suspension forms which is heated within about 2 hours to 175 to 180° C.; at about 140° C. a strong evolution of hydrochloric acid sets in. After another 5 to 6 hours the evolution of hydrochloric acid ceases. The yellow, pasty suspension is cooled to room temperature, suctioned and the filter cake is rinsed with dichlorobenzene, suspended in 3000 parts by volume of methanol and heated for a short time at the boil, then suctioned at room temperature and thoroughly rinsed with methanol. After drying, there are obtained about 413 parts of the compound of the formula

(10)
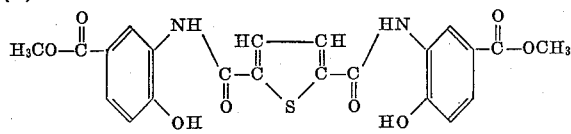

as a beige-colored powder melting at 316 to 318° C.

503 parts of the compound of the Formula 10 are stirred under nitrogen with 5 parts of boric acid in 1000 parts by volume of dibutylcarbitol. The reaction mixture is then heated within 4 hours to 245 to 250° C., with the solvent beginning to pass over. The temperature is maintained for 2 to 3 hours between 250 and 260° C., and there are obtained about 700 parts by volume of an aqueous distillate and as a residue a turbid melt diluted with solvent. The melt is diluted with dimethylformamide while still hot, then allowed to cool, suctioned and the filter cake is rinsed with dimethylformamide.

The residue is dissolved in much hot dimethylformamide, the undissolved matter is filtered off and the filtrate allowed to cool.

Yield: about 320 parts of the compound of the formula

(11)
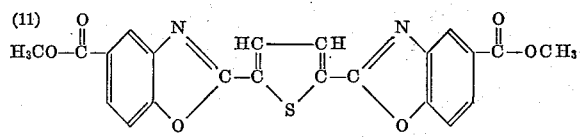

as a beige-colored powder melting at 280 to 283° C. The analytically pure product, obtained by recrystallization from dimethylformamide and sublimation in a high vacuum, melts at 294 to 294.5° C.

$C_{22}H_{14}O_6N_2S$ calculated: C, 60.83; H, 3.25; N, 6.45%. Found: C, 60.69; H, 3.21; N, 6.45%. Mol. weight: 434.43.

The following dibenzoxazolyl-thiophene compounds can be made in an analogous manner:

(12)
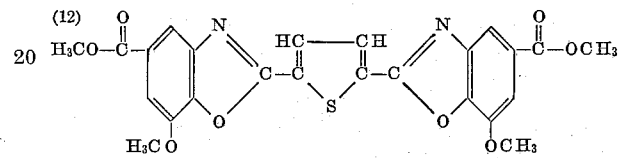

Light beige-colored, crystalline powder from dimethylformamide, melting at 273 to 276° C.

$C_{24}H_{18}O_8N_2S$ calculated: C, 58.30; H, 3.67; N, 5.67%. Found: C, 58.31; H, 3.76; N, 5.61%. Mol. weight: 494.48.

(13)
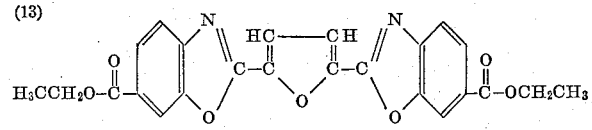

Light yellow, finely crystalline powder from dimethylformamide, melting at 243 to 244° C.

$C_{24}H_{18}O_6N_2S$ calculated: C, 62.33; H, 3.92; N, 6.06%. Found: C, 62.46; H, 3.92; N, 6.02%. Mol. weight: 462.49.

(14)
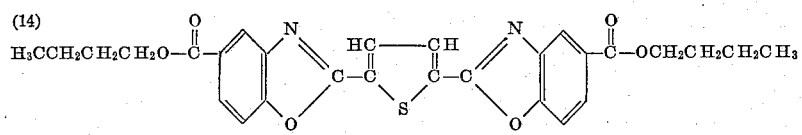

Yellowish, felted flakes from toluene+cyclohexane, melting at 189 to 190° C.

$C_{28}H_{26}O_6N_2S$ calculated: C, 64.85; H, 5.05; N, 5.40%. Found: C, 64.99; H, 5.02; N, 5.45%. Mol. weight: 518.59.

(15)
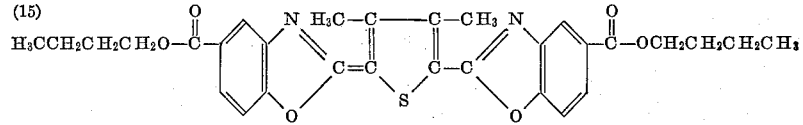

Light beige-colored, finely crystalline powder from dimethylformamide, melting at 205° C.

$C_{30}H_{30}O_6N_2S$ calculated: C, 65.92; H, 5.53; N, 5.12%. Found: C, 66.07; H, 5.43; N, 5.36%. Mol. weight: 546.64.

(16)
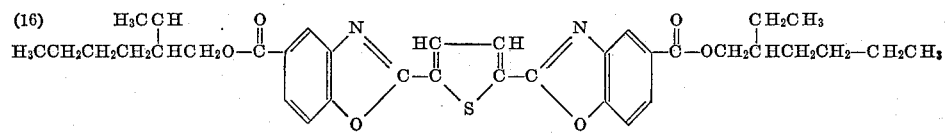

Yellowish flakes from cyclohexane, melting at 121 to 122° C.

$C_{36}H_{42}O_6N_2S$ calculated: C 68.55, H 6.71, N 4.44%. Found: C 68.31, H 6.80, N 4.33%. Mol. weight: 630.80.

(17) $H_3COCH_2CH_2O-\overset{O}{\overset{\|}{C}}-$[benzoxazole]$-C-C\underset{S}{\diagdown}C-C-$[benzoxazole]$-\overset{O}{\overset{\|}{C}}-OCH_2CH_2OCH_3$ Yellow, crystalline powder from benzene, melting at 185.5 to 186° C.

$C_{26}H_{22}O_8N_2S$ calculated: C 59.76, H 4.24, N 5.36%. Found: C 59.92, H 4.15, N 5.39%. Mol. weight: 522.53.

Example 2

A mixture of 11 parts of the dicarboxylic acid ester of the Formula 11, 250 parts by volume of ortho-dichlorobenzene and 40 parts by volume of n-octylamine is kept for 72 hours under a slight reflux, whereupon a clear solution is obtained which is allowed to cool to room temperature (about 20° C.), and the precipitate formed is suctioned off and washed with methanol. After drying, there are obtained about 10 parts of a light-yellow powder melting at 261 to 271° C. Repeated recrystallization from dimethylformamide furnishes the diamide of the formula

(18) $H_3C(CH_2)_7NH-\overset{O}{\overset{\|}{C}}-$[benzoxazole]$-C-C\underset{S}{\diagdown}C-C-$[benzoxazole]$-\overset{O}{\overset{\|}{C}}-NH(CH_2)_7CH_3$ as a pale yellow, crystalline powder, melting at 292 to 293° C.

$C_{36}H_{44}O_4N_4S$ calculated: C 68.76, H 7.05, N 8.91%. Found: C 68.67, H 6.97, N 9.10%. Mol. weight: 628.84.

Example 3

A mixture of 77.4 parts of finely powdered dicarboxylic acid ester of the Formula 11 and a solution of 54 parts of sodium hydroxide in 150 parts by volume of water and 1,200 parts by volume of ethyleneglycol monomethyl ether is refluxed for 24 hours, then allowed to cool to room temperature (about 20° C.), and the residue is suctioned off and thoroughly rinsed with methanol. To remove any residual starting material from the residue it is boiled with 2000 parts by volume of ortho-dichlorobenzene. After drying, there are obtained about 75.3 parts of the disodium salt of the formula

(19) $NaO-\overset{O}{\overset{\|}{C}}-$[benzoxazole]$-C-C\underset{S}{\diagdown}C-C-$[benzoxazole]$-\overset{O}{\overset{\|}{C}}-ONa$ as a beige-colored, granular powder which does not melt below 350° C.

The disodium salt of the Formula 19 is finely powdered and suspended in 4000 parts of boiling water. In the course of 30 minutes dilute hydrochloric acid is added drop by drop until a strongly acid reaction to Congo red has been attained, and the batch is refluxed for another 30 minutes and then allowed to cool with stirring. The reaction mixture is suctioned at room temperature (about 20° C.) and the residue is washed neutral with water. After drying, there are obtained about 57.5 parts of the dicarboxylic acid of the formula

(20) $HO-\overset{O}{\overset{\|}{C}}-$[benzoxazole]$-C-C\underset{S}{\diagdown}C-C-$[benzoxazole]$-\overset{O}{\overset{\|}{C}}-OH$ as a dark-beige colored powder which does not melt below 350° C. On crystallization from dimethylformamide, a yellow-beige powder is obtained which does not melt below 350° C.

$C_{20}H_{10}O_6N_2S$ calculated: C 59.11, H 2.48, N 6.89%. Found: C 59.01, H 2.56, N 7.14%. Mol. weight: 406.37.

Example 4

57.4 parts of finely powdered dicarboxylic acid of the Formula 20 are suspended in 400 parts by volume of anhydrous chlorobenzene. 7.5 parts by volume of thionylchloride and 5 drops of dimethylformamide are added and the whole is stirred for 6 hours at 90 to 95° C.; the evolution of hydrochloric acid then ceases and a thick, yellow suspension is obtained. It is suctioned at room temperature (about 20° C.) and the filter cake is washed with anhydrous hexane. After drying, there are obtained about 56 parts of the dicarboxylic acid chloride of the formula

(21) $Cl-\overset{O}{\overset{\|}{C}}-$[benzoxazole]$-C-C\underset{S}{\diagdown}C-C-$[benzoxazole]$-\overset{O}{\overset{\|}{C}}-Cl$ as a yellow powder melting at 260 to 262° C.

Example 5

4.1 parts of the dicarboxylic acid chloride of the Formula 21 are suspended in 100 parts by volume of anhydrous chlorobenzene. 5 parts of 4-(1′,1′,3′,3′-tetramethylbutyl)-phenol and 5 parts by volume of pyridine are added and the whole is refluxed for 2 hours, to form a turbid solution, which is mixed with 150 parts by volume of ethanol and allowed to cool to room temperature (about 20° C.). The batch is suction-filtered and the pale-yellow residue washed with alcohol. Two recrystallizations from toluene with the aid of active carbon yield the compound of the formula

(22) $H_3C-\underset{CH_3}{\overset{CH_3}{\overset{|}{\underset{|}{C}}}}-CH_2-\underset{CH_3}{\overset{CH_3}{\overset{|}{\underset{|}{C}}}}-$[phenyl]$-O-\overset{O}{\overset{\|}{C}}-$[benzoxazole]$-C-C\underset{S}{\diagdown}C-C-$[benzoxazole]$-\overset{O}{\overset{\|}{C}}-O-$[phenyl]$-\underset{CH_3}{\overset{CH_3}{\overset{|}{\underset{|}{C}}}}-CH_2-\underset{CH_3}{\overset{CH_3}{\overset{|}{\underset{|}{C}}}}-CH_3$ as a pale-yellow, crystalline powder melting at 251 to 252° C.

$C_{48}H_{50}O_6N_2S$ calculated: C 73.63, H 6.44, N 3.58%. Found: C 73.81, H 6.33, N 3.64%. Mol. weight: 783.00.

The following dibenzoxazolyl-thiophene compounds can be made in an analogous manner:

(23)

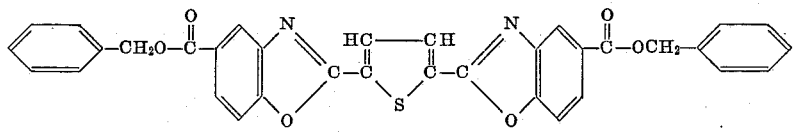

Light-yellow, small needles from toluene, melting at 229 to 230° C.

$C_{34}H_{22}O_6N_2S$ calculated: C 69.61, H 3.78, N 4.78%.
Found: C 69.71, H 3.90, N 4.77%. Mol. weight: 586.62.

(24)

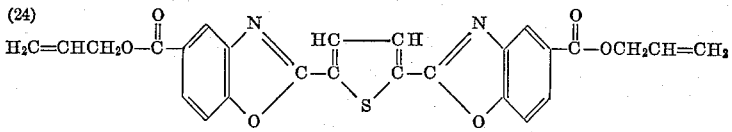

Light-yellow, crystalline powder from dimethylformamide, melting at 200 to 202° C.

$C_{26}H_{18}O_6N_2S$ calculated: C 64.19, H 3.73, N 5.76%.
Found: C 64.22, H 3.72, N 6.02%. Mol. weight: 486.50.

(25)

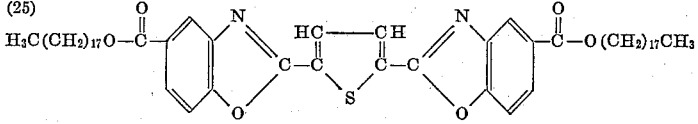

Faintly yellowish, finely crystalline powder from toluene, melting at 145 to 146° C.

$C_{56}H_{82}O_6N_2S$ Calculated: C 73.80, H 9.07, N 3.07%.
Found: C 73.62, H 8.97, N 2.95%. Mol weight: 911.34.

Example 6

6 parts of the dicarboxylic acid chloride of the Formula 21 are dissolved in 250 parts by volume of anhydrous chlorobenzene by heating to the reflux temperature. 10 parts of ethanolamine are then added dropwise, whereupon a light-yellow precipitate is immediately formed. The batch is refluxed for 10 minutes longer, suctioned at room temperature, and the residue is washed with alcohol. On dissolution in dimethylsulfoxide, clarifying by filtration and precipitation with alcohol there are obtained about 5.5 parts of the compound of the formula (26)

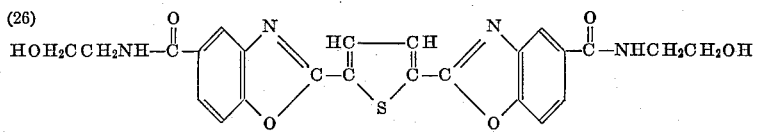

as a light-beige colored, finely crystalline powder which does not melt below 350° C. Crystallization from dimethylformamide furnishes pale-yellowish flakes which do not melt below 350° C.

$C_{24}H_{20}O_6N_4S$ calculated: C 58.53, H 4.09, N 11.38%.
Found: C 58.80, H 4.23, N 11.39%. Mol weight: 492.51.

Example 7

10,000 parts of a polyamide in chip form, prepared in the known manner from hexamethylenediamine adipate, are mixed for 12 hours in a tumbler with 30 parts of titanium dioxide (rutile modification) and 10 parts of the compound of the Formula 11. The chips treated in this manner are melted in a boiler which is heated at 300 to 310° C. with oil or diphenyl vapour and from which the atmospheric oxygen has been displaced with superheated steam, and the melt is stirred for half an hour, and then expressed through a spinneret under a nitrogen pressure of 5 atmospheres (gauge). The resulting, cooled filament is wound on a spinning bobbin. The filaments obtained in this manner display an excellent brightening effect which is stable to thermosetting and has good fastness to washing and light.

Example 8

A melt prepared from 100 parts of polyester (polyterephthalic acid ethyleneglycol ester) and 0.05 part of the compound of the Formula 11 is expressed through a nozzle to form a tape. The polytster tape produced in this manner has a substantially higher white content than a tape that does not contain the thiophene compound.

What is claimed is:

1. A 2,5-dibenzoxazolyl-thiophene compound of the formula

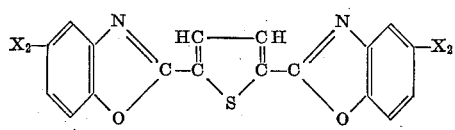

wherein X represents a member selected from the group consisting of a —COOH group, a —COO⁻ cation, a carboxylic alkyl ester group, said alkyl group containing from 1 to 20 carbon atoms, a carboxylic alkylphenyl ester group containing 1 to 20 carbon atoms in the alkylphenyl group, a carboxylic phenylalkyl ester group containing 1 to 20 carbon atoms in the phenylalkyl group, a carboxylic acid allyl ester group, a carboxylic halide group, a carboxylic acid nitrile group, a carboxylic acid amide group —CONH₂ and a carboxylic acid amide group —CONHR″, wherein R″ represents a member selected from the group consisting of an alkyl radical and a hydroxyalkyl radical, each of which contains 1 to 20 carbon atoms, $Z_1$ and $Z_2$ each represents a member selected from the group consisting of a hydrogen atom and a methyl group and Y represents a member selected from the group consisting of hydrogen and a methoxy group.

2. A compound of the formula wherein $X_2$ represents the carboxylic ester group —COOR′ wherein R′ stands for an alkyl radical of from 1 to 20 carbon atoms.

3. A compound of the formula

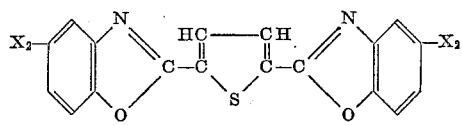

wherein $X_2$ represents a carboxylic acid amide group —CONHR″ wherein R″ stands for an alkyl radical of from 1 to 20 carbon atoms.

4. A compound of the formula

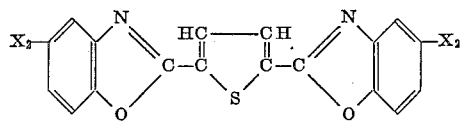

wherein $X_2$ represents a carboxylic acid amide group —CONHR″ which R″ stands for a hydroxyalkyl radical of from 1 to 20 carbon atoms.

5. A compound of the formula

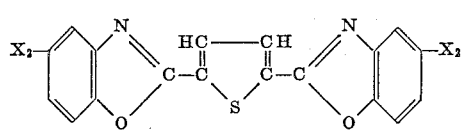

wherein $X_2$ represents the carboxylic ester group —COOR′ wherein R′ stands for an alkyl phenyl radical of from 1 to 20 carbon atoms.

6. A compound of the formula

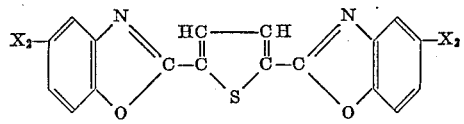

wherein $X_2$ represents the carboxylic ester group —COOR′ wherein R′ stands for a phenylalkyl radical of from 1 to 20 carbon atoms.

7. The compound of the formula

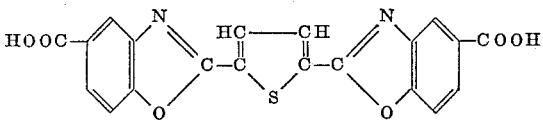

8. The compound of the formula

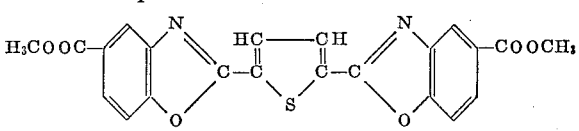

9. The compound of the formula

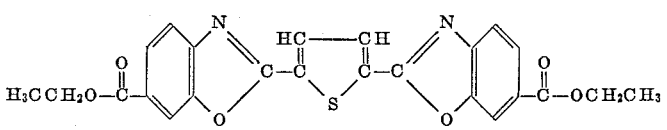

10. The compound of the formula

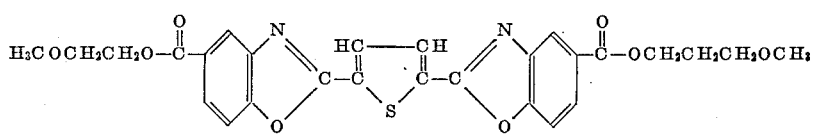

11. The compound of the formula

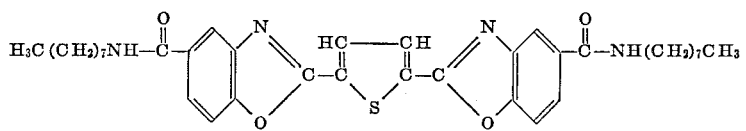

12. The compound of the formula

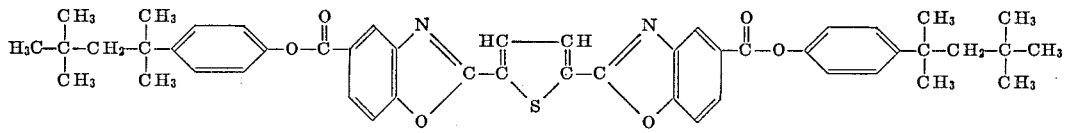

13. The compound of the formula

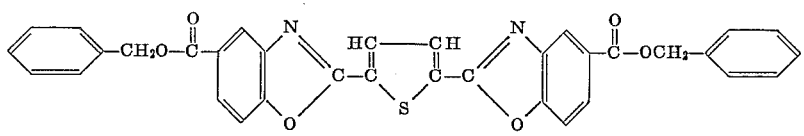

14. The compound of the formula

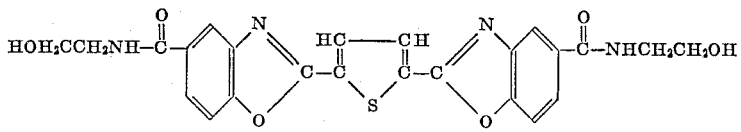

(References on following page)

References Cited by the Examiner

UNITED STATES PATENTS

| | | | |
|---|---|---|---|
| 2,985,661 | 5/1961 | Hein et al. | 260—307.4 |
| 3,005,779 | 10/1961 | Ackermann et al. | 252—301.2 |
| 3,095,421 | 6/1963 | Liechti et al. | 260—307 |
| 3,136,773 | 6/1964 | Maeder et al. | 260—307 |
| 3,137,655 | 6/1964 | Taul et al. | 252—301.2 |

OTHER REFERENCES

Nyilas et al., J. Am. Chem. Soc., vol. 82, pages 609–611 (1960).

HENRY R. JILES, *Acting Primary Examiner.*

A. D. ROLLINS, *Assistant Examiner.*